Patented May 30, 1950

2,509,315

UNITED STATES PATENT OFFICE 2,509,315

LIGHTWEIGHT FIREBRICK AND PROCESS OF PRODUCING THE SAME

Robert F. Rea, Chicago, Ill., assignor to Universal Zonolite Insulation Company, Chicago, Ill., a corporation of Montana No Drawing. Application April 15, 1947, Serial No. 741,686

3 Claims. (Cl. 106—40)

This invention relates to novel light-weight firebricks and the process for producing the same.

Such firebricks are extensively used in the construction of industrial furnaces and the re-lining of the same. The firebricks in these furnaces are subjected to high temperatures, and it is necessary that they be stable against breakdown in use, since the longer the life of the firebricks the fewer interruptions will be occasioned in the operation of the furnace.

Insulating firebricks have, in recent years, been classified into a number of groups related to the temperature of maximum service to which the bricks may be safely subjected. The groups are generally numerically designated as follows:

Group 16—Satisfactory to temperatures up to 1600° F.
Group 20—Satisfactory to temperatures up to 2000° F.
Group 23—Satisfactory to temperatures up to 2300° F.
Group 28—Satisfactory to temperatures up to 2800° F.
Group 30—Satisfactory to temperatures up to 3000° F.

The present invention is concerned with firebricks produced from exfoliated vermiculite and a binder of unique character under conditions yielding a novel firebrick that is useable with remarkable satisfaction at temperatures up to 2100° F. without appreciable shrinkage.

It is recognized that bentonite-bonded exfoliated vermiculite bricks have heretofore been produced. Such bentonite-bonded exfoliated vermiculite bricks are reasonably satisfactory in service up to temperatures of about 1800° F., but at higher temperatures shrinkage, believed to be occasioned by incipient fusion of the vermiculite and the bentonite binder, is so great as to render such bricks unuseable at the higher temperatures.

By the present invention it is possible to produce firebricks comprised of exfoliated vermiculite and the novel binder of this invention, which bricks can be satisfactorily used at temperatures at least as high as 2100° F. Thus, through the present invention, the field of use of exfoliated vermiculite firebricks is very substantially expanded.

In carrying out the present invention, the exfoliated vermiculite particles employed in producing the firebricks should pass a one-quarter inch opening, and at least 25% should pass a 30 mesh screen and no more than 20% should pass a 200 mesh screen.

The binder suitable for use in practicing the invention is known as hectorite. This clay mineral has been found in nature near Hector, California. It is described in some detail in the Geological Survey Professional Paper 205-B, entitled "Minerals of the Montmorillonite Group, Their Origin and Relation to Soils and Clays," by Clarence S. Ross and Sterling B. Hendricks, published in 1945 and available through the Superintendent of Documents, United States Government Printing Office. Hectorite may be generally characterized as having an $SiO_2$ to $MgO$ ratio of at least 2 to 1, and an $Al_2O_3$ content less than 1%.

Typical analyses of samples of hectorite are as follows:

|  | 1 | 2 | 3 | 4 |
|---|---|---|---|---|
| $SiO_2$ | 55.86 | 53.68 | 51.26 | 59.77 |
| $Al_2O_3$ | .13 | .60 | .36 | .49 |
| $Fe_2O_3$ | .03 |  | .09 | .026 |
| $FeO$ |  |  | .06 |  |
| $MgO$ | 25.03 | 25.34 | 23.25 | 27.46 |
| $CaO$ | Tr. | .52 | 2.60 | .45 |
| $K_2O$ | .10 | .07 | .10 |  |
| $Na_2O$ | 2.68 | 3.00 | 3.47 | 2.73 |
| $Li_2O$ | 1.05 | 1.12 | .60 |  |
| $CO_2$ |  |  | 1.35 |  |
| $F$ | 5.96 |  | None | 5.35 |
| $H_2O-$ | 9.90 | 7.28 | 11.56 |  |
| $H_2O+$ | 2.24 | 8.24 | 5.14 |  |

It is intended to comprehend through the use of the name "hectorite" not only the naturally occurring clay mineral, but synthetically produced materials of the same general composition. Some of the naturally occurring hectorite is found in admixture with microscopic calcite (calcium carbonate). The presence of calcite (calcium carbonate) crystals has no deleterious effect on the bonding power of the magnesium silicate of the hectorite, and appears to constitute no more than a diluent which does not depreciate the refractory character of the finished bricks. It is accordingly permissible and within the scope of the present invention to employ the hectorite in admixture with calcite, and reference in the subjoined claims to hectorite is not to be construed as exclusive of calcite.

By way of example, the process may be carried out in the following manner:

Seventy-five (75) pounds of exfoliated vermiculite, all the particles of which pass through a one-quarter inch opening and 40% of which pass a 30 mesh screen, with only 7% passing a 200 mesh screen, are mixed with 25 pounds of hectorite binder containing a minor portion of calcite crystals, all of the binder being finely pulverized. The exfoliated vermiculite and the binder are dry mixed until a uniform admixture is obtained, which admixture can be secured in one or two minutes in the conventional rotary mixer. Water is then added, preferably through sprays, and mixing continued until the water is evenly distributed throughout the mix, which usually requires not more than three minutes additional time, making the production of the wet mix require not more than about five minutes. The amount of water should be maintained within the limits of 30% to 50% by weight of the dry ingredients, and preferably at about 40% by weight of the dry ingredients when the bricks are to be formed by so-called dry pressing. The consistency of the above-described mix will be found to be such that in appearance it is dry but when subjected to pressure the mix will bond together. Any great excess of water causes the mix to adhere to the dies of the brick press, and furthermore makes the mix "gummy" and requires a prolonged drying period. The above-described mix is pressed in a suitable mechanical press to form bricks. The pressure required is of the order of 25 pounds per square inch. The pressed bricks are dried, preferably at a temperature of the order of 300° to 400° F., to remove the water added during mixing. After the bricks are thus dried, they are fired to a temperature between 1500° F. and 2000° F., during which firing a ceramic bond is formed between the binder and the vermiculite.

Bricks produced in accordance with the foregoing process have been found to withstand temperatures up to 2100° F. without appreciable shrinkage, and to fully comply with the ASTM specifications for shrinkage of insulating firebricks. The commercial classification for bricks known as Group 20, i. e. the 2000° F. class, requires that these bricks shink no more than 1% at 1950° F. The bricks produced in accordance with the present invention meet this commercial classification, whereas bricks of vermiculite composition heretofore produced have been relegated to a lower classification, since they have been incapable of meeting such specifications.

While in the exemplified procedure 25% by weight of the hectorite binder has been illustrated, it will be appreciated that a greater quantity of the binder can be employed and will yield somewhat greater strength with increased weight of the product. Lesser quantities of the binder can be employed, but occasion a decrease in the strength of the product. It is accordingly recommended that the binder be employed within the limits of from 15% to 30% by weight of the dry mixture.

While the invention is primarily addressed to insulating firebricks and the process of their manufacture, the dry mixture may be itself marketed and mixed with water to be applied as a cement liner in structures where brick lining is impractical, and wherein the cement may be dried and fired in situ.

Having thus described my invention, what I claim is:

1. A dry mix suitable for use in the production of insulating firebrick and furnace linings comprising from 70% to 85% by weight exfoliated vermiculite particles which pass a one-quarter inch opening, at least 25% by weight pass a 30 mesh screen and not more than 20% by weight pass a 200 mesh screen, and from 15% to 30% by weight of a finely pulverized binder of hectorite, characterized in that it has an $SiO_2$ to $MgO$ ratio of at least 2 to 1 and an $Al_2O_3$ content less than 1% by weight.

2. A process for producing insulating firebrick comprising forming a mixture containing from 70% to 85% by weight of exfoliated vermiculite particles characterized in that they pass through a one-quarter inch opening, at least 25% thereof passing a 30 mesh screen and not more than 20% thereof passing a 200 mesh screen, and from 15% to 30% by weight of a binder of hectorite characterized in that it has a $SiO_2$ to $MgO$ ratio of at least 2 to 1 and an $Al_2O_3$ content of less than 1% by weight, adding sufficient water to said mixture to render the same of moldable consistency, pressing the water containing moldable mixture into bricks, drying the bricks to drive off the added water, and thereafter firing the bricks at a temperature of from 1500° F. to 2000° F. to form a ceramic bond between the binder and the vermiculite.

3. An insulating firebrick capable of withstanding temperatures up to 2100° F. without appreciable shrinkage, comprised of from 70% to 85% by weight of exfoliated vermiculite particles, which pass a one-quarter inch opening, at least 25% of which pass a 30 mesh screen, and not more than 20% of which pass a 200 mesh screen, and from 15% to 30% by weight of a binder of hectorite having an $SiO_2$ to $MgO$ ratio of at least 2 to 1 and an $Al_2O_3$ content less than 1% by weight.

ROBERT F. REA.

REFERENCES CITED

The following references are of record in the file of this patent:

UNITED STATES PATENTS

| Number | Name | Date |
|---|---|---|
| 2,079,665 | Seigle | May 11, 1937 |
| 2,215,078 | Cavadino | Sept. 17, 1940 |

FOREIGN PATENTS

| Number | Country | Date |
|---|---|---|
| 485,506 | Great Britain | 1938 |

OTHER REFERENCES

Stern: "Role of Clay and other Minerals in Oil-Well Drilling Fluids," page 58 (U. S. Bureau of Mines, Feb. 1941, Report of investigations, No. 3556).